UNITED STATES PATENT OFFICE 2,412,390

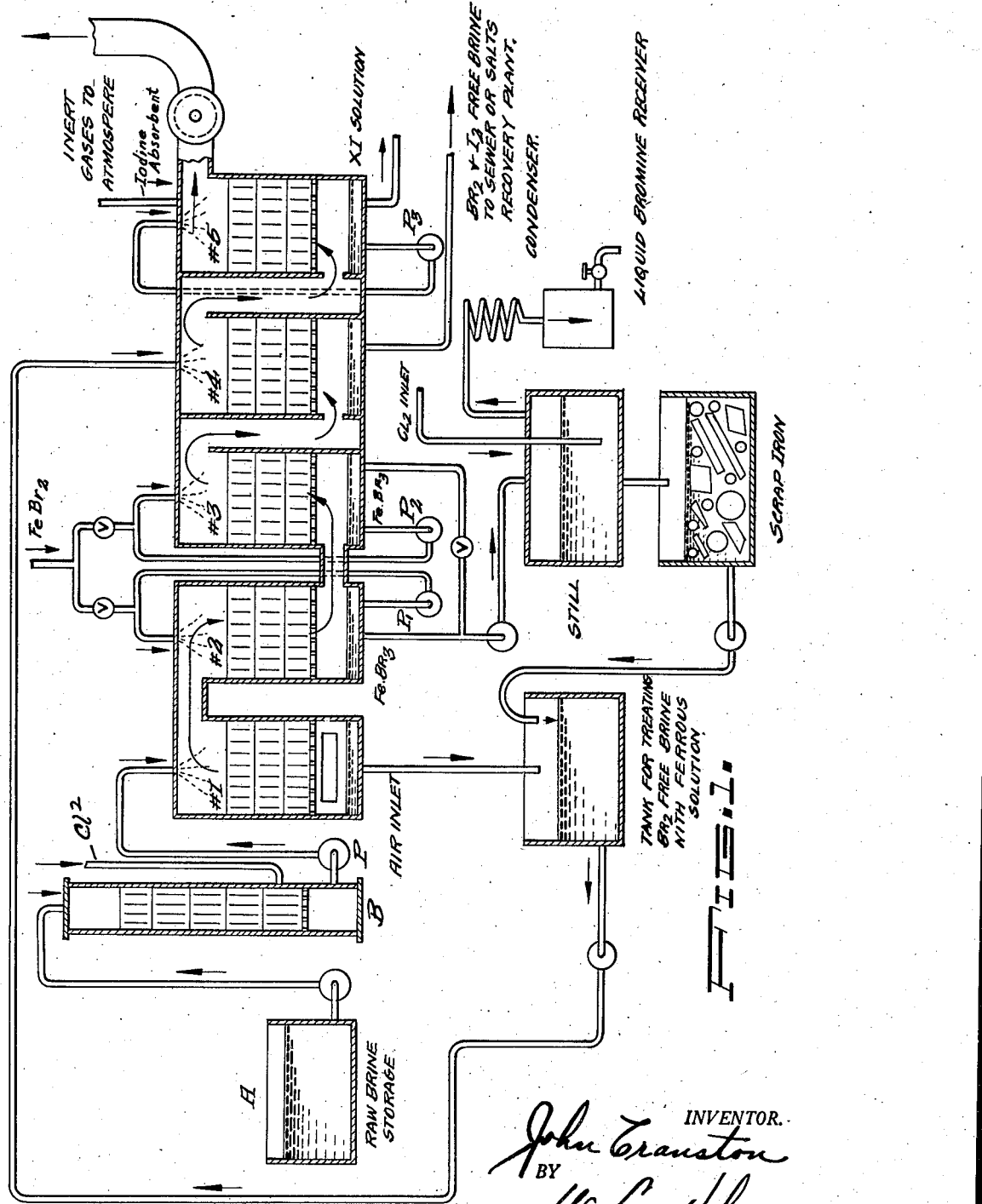

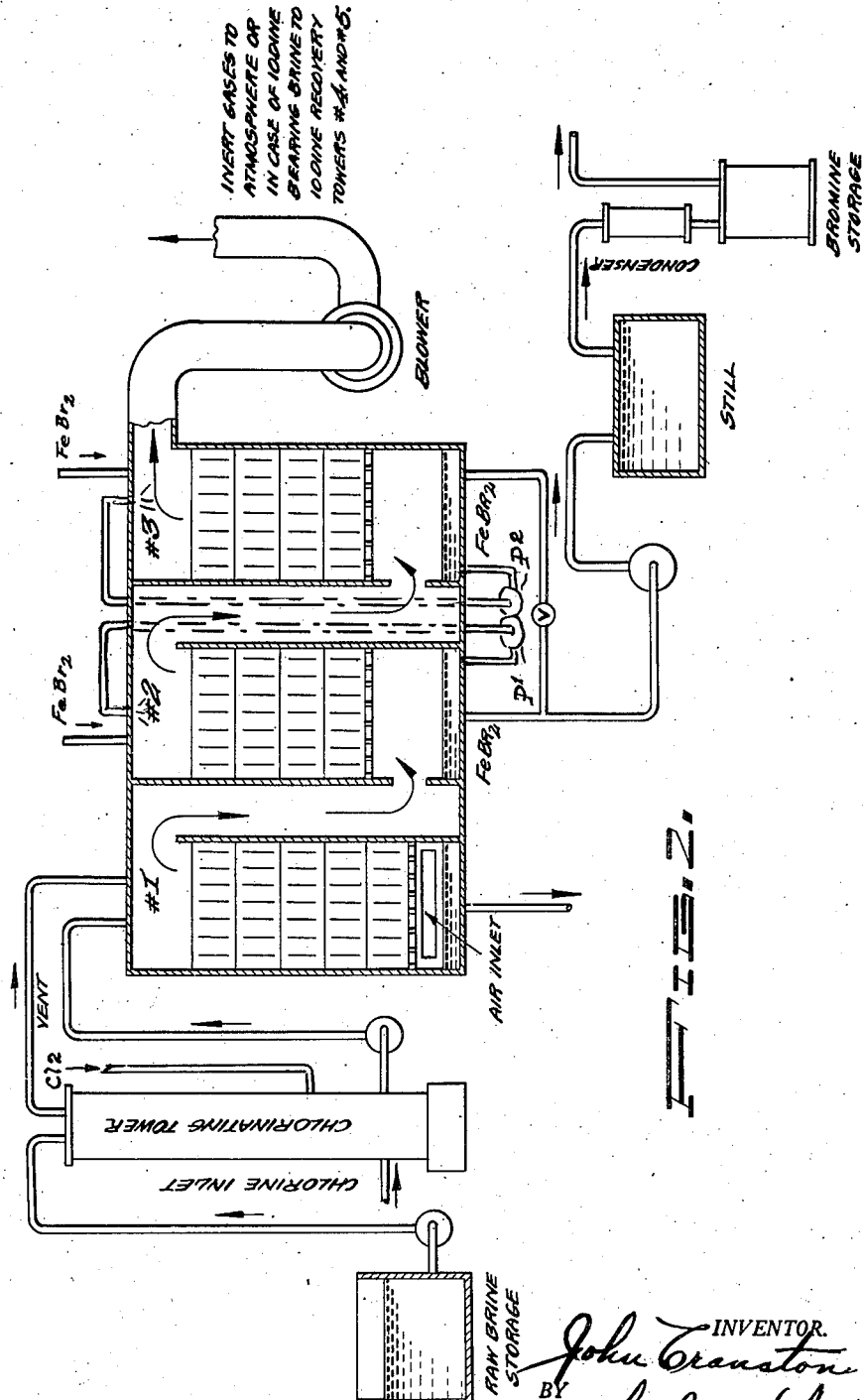

RECOVERY OF BROMINE AND IODINE FROM NATURAL BRINES

John Cranston, Ironton, Ohio

Application May 25, 1943, Serial No. 488,378

2 Claims. (Cl. 23—217)

The object of the present invention is to provide an economical and efficient method of recovering bromine, and also iodine, from natural brines, such brines being, for example, found in the Niagara formation in eastern and southern Ohio, the latter brine containing about three pounds of bromine per ton, and about one-half ounce of iodine per ton, calculated as elemental halogens. It has been considered impractical to attempt recovery of such a small proportion of iodine, amounting to little more than a trace of the material. However, if the recovery can be accomplished at little or no additional expense in the recovery of larger constituents of the brine, such as the bromine, the gross value of the iodine might well, in a commercial plant, amount to a number of thousands of dollars yearly.

By means of the present invention, I not only provide an improved and more economical process for the recovery of liquid bromine, but also make use of certain side products resulting from the bromine operations to recover the iodine content at such low cost as to make its recovery commercially practical.

The characteristic of my bromine process is that it produces liquid bromine from vapors thereof distilled at a temperature of only 2 or 3° C. above its own boiling point. This low temperature recovery of the bromine effects a number of economies, both in the amount and character of the equipment required and in cost and ease of operation. The characteristic of the iodine operation is that it proceeds simultaneously with the bromine recovery, making use of certain operations and side products of the bromine recovery.

My method will be described with reference to the accompanying drawings, in which—

Figure 1 is a diagrammatic view in elevation showing the assembled units of a complete bromine-iodine recovery plant, employing my process, certain tank and column casings being shown in section.

Figure 2 is a diagrammatic elevation, partly in section, showing the assembled units used in my method for the recovery of bromine alone or for the recovery of the bromine followed by the passage of the bromine removed constituents of the brine to iodine recovery towers.

I will now describe my method as used for simultaneous recovery of both the bromine and iodine constituents of natural brine:

The first step in the process is to treat the raw brine with sufficient chlorine to liberate approximately 98% of the bromine, with simultaneous oxidation of any iodide to the iodate,

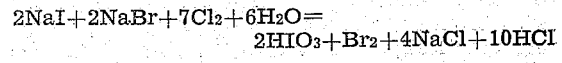

$2NaI + 2NaBr + 7Cl_2 + 6H_2O = 2HIO_3 + Br_2 + 4NaCl + 10HCl$

Referring to Figure 1 of the drawings, it will be seen that the raw brine may be pumped from the tank containing the same to the top of the chlorinating tower, the latter receiving chlorine as indicated. It is well known that by treating the brine previous to chlorination with sufficient acid to give a pH value of 2.5–3.0, the required amount of chlorine is substantially reduced, this required amount being in excess of the theoretical. In my method I accomplish acidification of the brine by addition of chlorine in amount 75–100% in excess of the theoretical. This excess chlorine furnishes its equivalent as hydrochloric acid, and gives the spent brine a pH of 1.1, which serves a useful purpose in the liberation of the iodine as to be hereinafter explained in detail.

After the brine is acidified it is pumped to the top of a packed column 1, where it is brought into contact with an upwardly directed current of air which is admitted to the bottom of column 1. The brine in its contact with the packing of column 1 is brought into mechanical disturbance, and this disturbance lowers the surface tension of the brine which brings the bromine out of solution so that it is absorbed as vapor by the upwardly directed current of air, and re-establishment of equilibrium between the bromine vapor and the brine is prevented.

The air passing away at the top of air absorption tower 1, heretofore termed the packed column 1, carries bromine vapor, some hydrochloric acid, and also traces of organic gases represented by the series corresponding to chloroform, bromoform, etc.

In passing from air absorption tower 1, the air, carrying bromine vapor, etc., enters the first one of two columns, 2 and 3 respectively, at the base of which is a leak-proof tank filled with a solution of ferrous bromide. Immediately above the level of ferrous bromide in tank 2 is a horizontal duct communicating with the second column 3 which has at its base a tank area filled with ferrous bromide solution. The solution is continuously circulated from the base of each of the columns 2 and 3 to the top thereof by means of pumps P1 and P2 and the piping indicated in the drawings. The columns 2 and 3 are packed or plate columns, as indicated in the drawings. As the current of mixed gases passes through column 2 most of the bromine unites with the ferrous bromide solution, converting it to the ferric condition. The air current, with any traces of bromine passes through column 3 where such remaining bromine is absorbed in the ferrous solution of that column, while the inert gases pass on to column 4.

When the ferrous solution in column 2 has been completely brominated to the ferric condition, it is ready to be treated for the separation of its bromine content as liquid bromine. The finished ferric solution should be at a specific gravity corresponding to 1½-2 pounds per gallon, figured as elemental bromine.

The said strong ferric solution is pumped from column 2 to the still indicated in the drawings, where the temperature of the solution is raised to 60° C., or the solution may be pre-heated to this temperature before its transfer to the still. With the solution in the still and the heat controlled to 60° C., chlorine gas is introduced into the solution at the rate of approximately 100 pounds per hour per 1000 gallons of solution in the still. When the solution becomes saturated with bromine, concentrated bromine gas, carrying practically no water vapor, passes from the still to the condenser, and as long as any combined bromine remains in the solution, the chemical equivalent of bromine will be immediately discharged to the condenser with each equivalent of chlorine injected into the solution. 90% of the bromine will be discharged to the condenser without further addition of artificial heat beyond the initial amount used to bring the temperature of the solution to 60° C., the gas passing to the condenser at a temperature of only 2 or 3° C. above the boiling point of bromine.

When all of the ferric bromide has been converted to ferric chloride, the flow of chlorine is stopped, and the traces of bromine remaining in the ferric chloride solution may be steamed out by direct injection of low pressure steam.

It will be understood that when the concentration of ferric solution in column 3 has reached a high degree it also may be transferred to the still for action as required.

The condensation of concentrated bromine gas at the stated low temperature eliminates the necessity for condensing quantities of water vapor, with its high latent heat of evaporation, a condition which prevails through operation of the conventional distillation methods by high temperature steam. The absence of water vapor permits the use of greatly reduced condenser surfaces with use of minimum cooling liquid. The absence of high temperatures throughout operation of the method simplifies construction of equipment and prolongs its life.

From the foregoing it will be seen that brine at the base of the air-absorbing column 1 is bromine-free. For the liberation of elemental iodine from the iodate in said brine, I first reduce the ferric chloride still-liquor taken from the still shown in the drawings, to ferrous chloride. The still-liquor is discharged into a tank, as indicated in the drawings, this tank containing iron particles such as scrap iron. The ferrous chloride thus formed is pumped into a tank which receives brine discharged from the air-absorbing column 1. In the latter tank elemental iodine is liberated from the iodate in the bromine-free brine by oxidation of the iron solution to the ferric iron, so that the brine will carry free iodine in solution. This solution is pumped to the top of column 4.

As the brine, with its free iodine in solution, passes downwardly through column 4, which is a packed or plate column as shown in the drawings, it comes into contact with the current of air which theretofore has carried the bromine vapor through towers 2 and 3. This air current absorbs the iodine vapor in the same way in which the bromine was earlier absorbed thereby. At the base of column 4 is a collection chamber or tank for receiving the bromine and iodine-free brine and the latter may be discharged via the pipe shown in the drawings.

The air current with its content of iodine vapor is discharged from column 4 into a column 5 near the base thereof and through which is circulated any desired solution for picking up and concentrating the iodine vapor carried by the air current. These solutions may be of sodium hydroxide, sodium carbonate, or the corresponding potassium compounds. When the concentration of iodine in the solution has reached a desired point, the solution may be drawn off for the preparation of any desired salt of iodine, and, of course, the iodine salt may be treated for the separation of elemental iodine.

It is to be noted that in my process the liberation of the iodine is accomplished by a reducing agent; namely, ferrous chloride obtained from the ferric chloride still-liquor. Furthermore, the iodide salt present in the raw brine at the commencement of the process, is deliberately over-oxidized to the iodate for accomplishing the liberation of the iodine by use of still-waste from the bromine process.

I prefer, in the initial step of the bromine process, to warm the raw brine to about 40–45° C. by any convenient means after which chlorine is added in sufficient quantity to over-oxidize the iodate and to give approximately 98% liberation of bromine. By warming the brine within the temperature range stated, the reaction is many times accelerated over a method in which the brine is treated at ordinary temperatures at the initial stage of treatment.

In my method there is no necessity for purification of the dilute vapors taken directly off the brine, as is required in other processes, and this permits reduction in construction and operations costs and dispensing with purification towers, packing, pumps and pipelines. In my method purification of the gas is automatic by reason of the fact that the bromine gas is liberated in the presence of an excess of ferric bromide.

Having described my invention, what I claim and desire to secure by Letters Patent is as follows:

1. A method of recovering bromine and iodine from natural brines which consists in treating the raw brine with excess chlorine sufficient to liberate the major bromine content of the brine and to give the spent brine a pH of approximately 1.1, lowering the surface tension of the brine by agitating it whilst it is moving in a flowing stream and simultaneously passing a current of air through the flowing stream of brine under agitation, thereby absorbing the liberated bromine vapor, removing the bromine content of the air by absorption in a ferrous bromide solution, which is brominated to the ferric condition, chlorinating the ferric solution at a temperature of substantially 60° C., removing the concentrated bromine gas thus formed and condensing it to liquid bromine, reducing the remaining ferric chloride to ferrous chloride, and bringing the ferrous chloride into contact with the bromine-spent brine, whereby elemental iodine is liberated from the iodate in the bromine-free brine by oxidation of the iron solution to ferric iron passing the brine with its free iodine into a zone wherein the iodine is removed therefrom by a stream of air, and then passing said stream through an absorption medium for the iodine.

2. The method in accordance with claim 1, including the steps of passing the brine, with its free iodine in solution into a closed zone, receiving the current of air from which the bromine content has been removed by absorption, and passing the brine in a flow broken up into streams in contact with said air current, whereby the latter constitutes an absorption medium for iodine vapor liberated from the brine.

JOHN CRANSTON.